United States Patent [19]
Wu

[11] Patent Number: 5,949,912
[45] Date of Patent: Sep. 7, 1999

[54] IMAGE CODING METHOD AND APPARATUS

[75] Inventor: Zhixiong Wu, Tokyo, Japan

[73] Assignee: Oki Electric Industry Co., Ltd., Tokyo, Japan

[21] Appl. No.: 08/884,330

[22] Filed: Jun. 27, 1997

[30] Foreign Application Priority Data

Jun. 28, 1996 [JP] Japan ..................................... 8-169907
Sep. 19, 1996 [JP] Japan ..................................... 8-247970

[51] Int. Cl.⁶ .................................................. G06K 9/36
[52] U.S. Cl. ........................ 382/246; 382/232; 382/248; 348/398; 395/200.77
[58] Field of Search ............................... 382/232, 246, 382/248; 348/398; 395/200.77

[56] References Cited

U.S. PATENT DOCUMENTS

| | | | |
|---|---|---|---|
| 5,321,776 | 6/1994 | Shapiro | 348/384 |
| 5,537,493 | 7/1996 | Wilkinson | 382/240 |
| 5,602,589 | 2/1997 | Vishwanath et al. | 348/398 |
| 5,646,618 | 7/1997 | Walsh | 341/67 |
| 5,661,822 | 8/1997 | Knowles et al. | 382/233 |
| 5,675,669 | 10/1997 | Kim | 382/241 |
| 5,710,835 | 1/1998 | Bradley | 382/233 |
| 5,729,691 | 3/1998 | Agarwal | 395/200 |
| 5,761,341 | 6/1998 | Go | 382/232 |
| 5,768,434 | 6/1998 | Ran | 382/240 |
| 5,798,794 | 8/1998 | Takabashi | 348/398 |
| 5,825,935 | 10/1998 | Murakoshi | 382/248 |

FOREIGN PATENT DOCUMENTS

| | | |
|---|---|---|
| 0 442 096 | 8/1991 | European Pat. Off. . |
| 0 561 593 | 9/1993 | European Pat. Off. . |
| 0 607 484 | 7/1994 | European Pat. Off. . |
| 0 642 272 | 3/1995 | European Pat. Off. . |
| 2 268 655 | 1/1994 | United Kingdom . |

OTHER PUBLICATIONS

W.C. Chang et al., "Lossless Image Compression Methods for PET Imaging", Biomedical Engineering, Applications Basis Communications, Biomed. Eng. Soc. Republic of China, Taiwan, vol. 8, pp. 309–316, Jun. 25, 1996.

Z. Wu et al. "Block–Based DCT and Wavelet Selective Coding for Arbitrary–Shaped Images", SPIE Visual Communications and Image Processing, vol. 3024, Part 1, pp. 658–665, Feb. 12, 1997.

ISO/IEC Standard 11172–2, 1993(E), pp. 32–38.

*Primary Examiner*—Amelia Au
*Assistant Examiner*—Mehrdad Dastouri
*Attorney, Agent, or Firm*—Wenderoth, Lind & Ponack, L.L.P.

[57] ABSTRACT

A digitized image is divided into blocks and a wavelet transform is performed, producing wavelet blocks which are quantized, scanned into linear sequences, and then coded. The scanning of each wavelet block starts with a purely low-frequency element. The high-frequency elements are scanned in a sequence that depends on the occurrence of non-zero elements among the high-frequency elements. When a non-zero element is scanned, this information is used to proceed quickly to related high-frequency elements. This scanning method tends to produce a linear sequence in which non-zero elements are clustered together. Such sequences can be coded efficiently.

12 Claims, 12 Drawing Sheets

| LL1 | HL1 | HL21 | HL31 |
|---|---|---|---|
| LH1 | HH1 | HL22 | HL32 |
| LH21 | LH22 | HH2 | HL33 |
| LH31 | LH32 | LH33 | HH3 |

FIG. 3
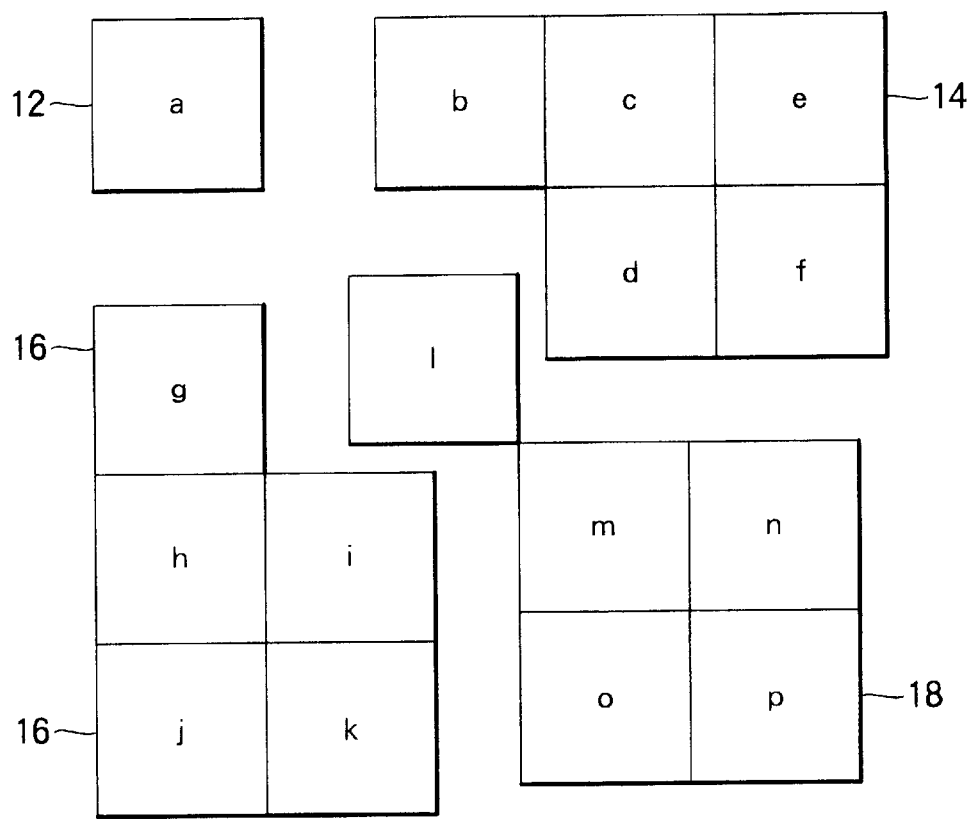
FIG. 4      FIG. 5      FIG. 6
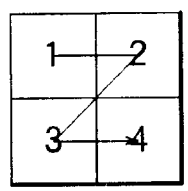 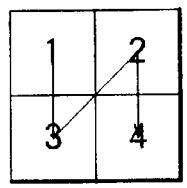 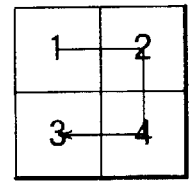
FIG. 7      FIG. 8      FIG. 9
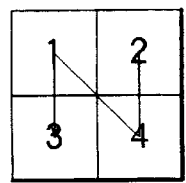 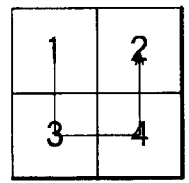 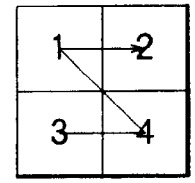

IMAGE CODING METHOD AND APPARATUS

BACKGROUND OF THE INVENTION

The present invention relates to a method and apparatus employing the wavelet transform for image compression, and more particularly relates to the scanning sequence of the output of the wavelet transform.

Image compression methods using the discrete cosine transform have been standardized by the Joint Photographic Experts Group (JPEG) and the Moving Picture Experts Group (MPEG). These methods divide an image into blocks, execute a discrete cosine transform on each block, quantize the resulting coefficients, rearrange the coefficients in a zigzag scanning sequence that tends to collect most of the zero coefficients at the end of each block, and then encodes the coefficients by a variable-length coding scheme in which a single codeword represents either a terminal string of consecutive zero coefficients, or a non-zero coefficient and the preceding zero coefficients, wherein the length of the codeword decreasing as the magnitude of the non-zero coefficient decreases and as the number of preceding zeros decreases.

Recently, however, there has been much interest in alternative image compression methods that use the wavelet transform. The wavelet transform iteratively separates low spatial frequencies from high spatial frequencies to produce a multiresolution representation of an image. For many images, the wavelet transform offers the possibility of a higher compression ratio than the discrete cosine transform.

The output of the wavelet transform can be compressed by the same quantization, zigzag scanning, and encoding steps used to compress the output of the discrete cosine transform, but for the wavelet transform, the zigzag scanning sequence is not ideal. Instead of collecting zero values at the end of each block, the zigzag scanning sequence tends to intermingle the zero values and non-zero values, which impairs the coding efficiency.

SUMMARY OF THE INVENTION

It is accordingly an object of the present invention to improve the compression ratio of image compression methods and apparatus employing the wavelet transform.

A more specific object is to scan the quantized output of the wavelet transform in a sequence that makes non-zero values cluster together.

The invented method and apparatus encode a digitized image by dividing the image into blocks and perform a wavelet transform, thereby generating a plurality of wavelet blocks. Each wavelet block has at least one purely low-frequency element, a plurality of diagonal high-frequency elements representing equal horizontal and vertical spatial frequencies, a plurality of horizontal high-frequency elements representing higher horizontal than vertical spatial frequencies, and a plurality of vertical high-frequency elements representing higher vertical than horizontal spatial frequencies. These elements are quantized, then scanned as follows.

In each wavelet block, the scan starts with the purely low-frequency element or elements, then proceeds to the horizontal, vertical, and diagonal high-frequency elements. These high-frequency elements are scanned in a sequence that varies according to the occurrence of non-zero elements. When a non-zero horizontal element is scanned, this information is used to proceed quickly to related higher-frequency horizontal elements, which are likely also to have non-zero values. Non-zero vertical and diagonal elements receive similar treatment.

The scan rearranges the elements in each wavelet block in a linear sequence. The elements are then coded, using a variable-length code in which a non-zero value and any consecutively preceding zero values are represented by a single codeword, fewer consecutively preceding zero values resulting in shorter codewords.

BRIEF DESCRIPTION OF THE DRAWINGS

In the attached drawings:

FIG. 3 illustrates a further division of the spatial frequency groups in FIG. 2 into two-by-two subblocks;

FIGS. 4, 5, 6, 7, 8, and 9 illustrate scanning sequences within these two-by-two subblocks;

DETAILED DESCRIPTION OF THE INVENTION

Embodiments of the invention will be described with reference to the attached illustrative drawings.

First Embodiment

Figure 1:
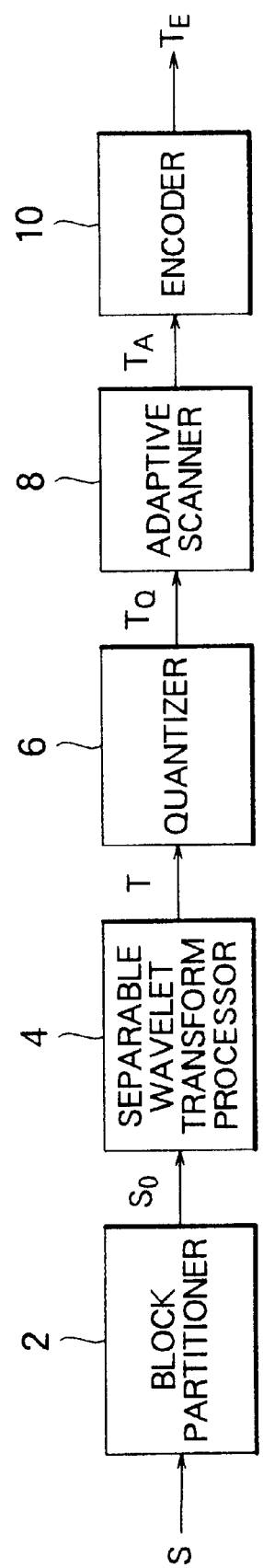
FIG. 1 is a block diagram of a first embodiment of the invention.

Referring to FIG. 1, the first embodiment is an image compressor comprising a block partitioner 2, a separable wavelet transform processor 4, a quantizer 6, an adaptive scanner 8, and an encoder 10.

The block partitioner 2 receives a digitized image signal S representing a rectangular still picture, or a single rectangular frame in a moving picture, or the difference between two rectangular frames in a moving picture, and partitions the image into eight-by-eight blocks of picture elements, referred to below as image blocks, thereby producing a partitioned signal $S_0$.

The separable wavelet transform processor 4 performs a separable wavelet transform that converts each image block into an eight-by-eight block of transformed values T, referred to below as a wavelet block.

The quantizer 6 quantizes the output T of the wavelet transform by, for example, dividing the values of T by a constant representing a quantization step size and then rounds off the results to integer values, producing a quantized signal $T_Q$.

The adaptive scanner 8 rearranges the quantized values of $T_Q$ in each wavelet block into a linear sequence of sixty-four values, producing a rearranged signal $T_A$.

The encoder 10 encodes the rearranged signal $T_A$ by a variable-length coding scheme similar to that used in MPEG image compression, in which a single variable-length codeword represents a non-zero value and the consecutively preceding zero values (if any), the length of the codeword generally decreasing as the number of preceding zeros decreases. Also provided are end-of-group and end-of-block codewords, which designate terminal strings of an arbitrary number of zero values.

The elements in FIG. 1 may be separate modules comprising respective memory circuits and arithmetic and logic circuits, possibly all contained within a single semiconductor integrated circuit. Alternatively, the invention can be practiced by means of a suitably-programmed general-purpose computing device such as a microprocessor or digital signal processor.

Next, the operation of the separable wavelet transform processor 4 and adaptive scanner 8 will be described in more detail.

The separable wavelet transform processor 4 performs three consecutive pairs of filtering operations in the horizontal direction and three consecutive pairs of filtering operations in the vertical direction on each image block. Each pair of filtering operations employs a high-pass filter g(k) and a low-pass filter h(k), where k takes on values from −n to m, centered around zero (m and n being non-negative integers). The Fourier transforms $G(\omega)$ and $H(\omega)$ of these filters satisfy the relation:

$$|H(\omega)|^2+|G(\omega)|^2=1$$

The filtering operations can be described by the following equations. For horizontal filtering, the variable j represents the horizontal coordinate in the image block. For vertical filtering, j represents the vertical coordinate. For an eight-by-eight block, n is typically zero and m is typically one, and the filtering operations are performed basically by taking the sum and difference of pairs of adjacent values.

$$S_{i+1}(j) = \sum_{k=-n}^{k=m} S_i(2j+k)h(k)$$

$$W_{i+1}(j) = \sum_{k=-n}^{k=m} S_i(2j+k)g(k)$$

These operations are first iterated in one dimension, e.g. the horizontal dimension, for $0 \leq i \leq 2$. Thus $S_0$ is decomposed into a low-frequency component $S_1$ and a high-frequency component $W_1$, after which $S_1$ is decomposed into similar components $S_2$ and $W_2$, and $S_2$ is decomposed into similar components $S_3$ and $W_3$. Then the same iteration is performed on each of $W_1$, $W_2$, $W_3$, and $S_3$ in the other (e.g. vertical) dimension. The result T is the same regardless of whether the horizontal iteration or vertical iteration is performed first.

Figures 2A, 2B:
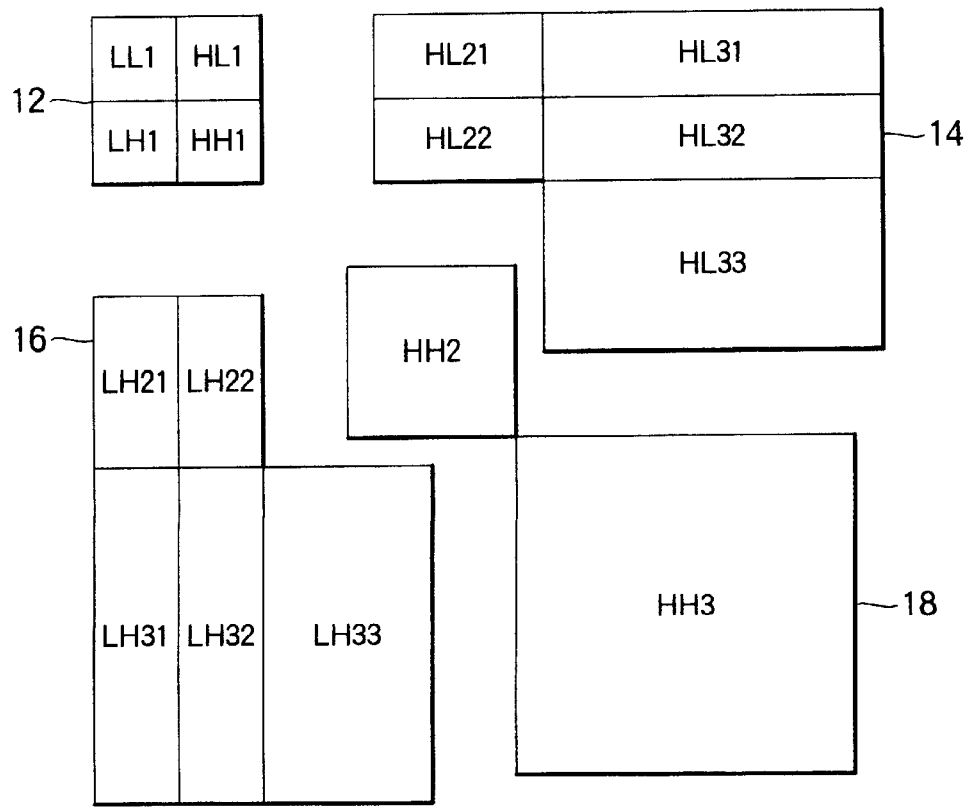
FIG. 2A illustrates the division of a wavelet block into frequency components.
FIG. 2B illustrates the division of a wavelet block into spatial frequency groups.

The resulting wavelet block is divided into frequency components as shown in FIG. 2A. Each component represents a different combination of horizontal and vertical spatial frequencies. Horizontal spatial frequencies increases from left to right in the drawing, and vertical spatial frequencies increases from top to bottom.

The frequency components and their constituent elements can be classified as horizontal, vertical, or diagonal. In this classification, diagonal means that the component or element represents equal horizontal and vertical spatial frequencies. LL1, HH1, HH2, and HH3 are diagonal components. Horizontal means that the horizontal spatial frequency is greater than the vertical spatial frequency. HL1, HL21, HL22, HL31, HL32, and HL33 are horizontal components. Vertical means that the vertical spatial frequency is greater than the horizontal spatial frequency. LH1, LH21, LH22, LH31, LH32, and LH33 are vertical components. Components LL1, HL1, LH1, and HH1 have just one element apiece.

Element LL1 is a purely low-frequency element, or direct-current (dc) element, representing the average value of all picture elements in the image block. The elements in other components represent high-frequency information in at least one dimension.

Among these other elements, the lowest-frequency horizontal element HL1 compares the left half of the image block with the right half of the image block. The lowest-frequency vertical element LH1 compares the top half of the image block with the bottom half. The lowest high-frequency diagonal element HH1 compares the top-left and bottom-right quarters of the image block with the top-right and bottom-left quarters.

Other elements make similar comparisons at higher spatial frequencies. For example, HL31 comprises four elements, each comparing a pair of adjacent vertical columns in the image block. HH3 comprises sixteen elements that make diagonal comparisons in two-by-two subblocks of the image block.

Referring to FIG. 2B, the above frequency components can be divided into four groups: a low-frequency group 12 and three high-frequency groups 14, 16, and 18. The low-frequency group 12 is a two-by-two subblock comprising the purely low-frequency element LL1 and the lowest high-frequency elements HL1, LH1, and HH1. Among the high-frequency groups 14, 16, and 18, the horizontal group 14 comprises higher-frequency horizontal elements and is thus related to horizontal element HL1, the relation being that the horizontal group 14 refines the information given by element HL1. The vertical group 16 is similarly related to vertical element LH1, and the diagonal group 18 is similarly related to diagonal element HH1.

Referring to FIG. 3, the high-frequency groups 14, 16, and 18 can be broken down into two-by-two subblocks, so that the entire wavelet block consists of two-by-two subblocks identified by the letters from 'a' to 'p.' After quantization, the adaptive scanner 8 scans these two-by-two subblocks one at a time, so that when the scan enters a two-by-two subblock, all elements in that two-by-two subblock are scanned before any elements in any other two-by-two subblock is scanned. The scanning sequence is determined by the occurrence of non-zero values, as follows.

First of all, the low-frequency subblock 'a' is scanned in the sequence shown in FIG. 4. In the notation of FIG. 2, the first four elements of the scan are LL1, HL1, LH1, and HH1, taken in this order.

Next, the high-frequency groups 14, 16, and 18 are scanned in an order determined adaptively by the occurrence of non-zero elements among HL1, LH1, and HH1. First, the horizontal group 14 is scanned if horizontal element HL1 is non-zero, and temporarily skipped if HL1 is zero. Next, the vertical group 16 is scanned if vertical element LH1 is non-zero, and temporarily skipped if LH1 is zero. Next, the diagonal group 18 is scanned if diagonal element HH1 is non-zero, and temporarily skipped if HH1 is zero. Then the groups that were temporarily skipped are scanned, following the same horizontal-vertical-diagonal order.

For example, if horizontal element HL1 is zero, vertical element LH1 is non-zero, and diagonal element HH1 is zero, then among the high-frequency groups, the vertical group 16 is scanned first, the horizontal group 14 next, and the diagonal group 18 last.

The scanning sequence within each high-frequency group is also determined adaptively. The scanning sequence in the horizontal group 14 is determined as follows.

First, the adaptive scanner 8 checks the top-left element in subblock 'b,' indicated by the numeral one in FIG. 5. If this element is non-zero, subblock 'b' is scanned in the sequence shown in FIG. 5. If this element is zero, subblock 'b' is scanned in the sequence shown in FIG. 6.

If either of the elements in the left column in subblock 'b' is non-zero, then subblock 'c' is scanned next. Otherwise, subblock 'e' is scanned next. Blocks 'c' and 'e' are scanned in the same way as subblock 'b,' following the sequence in FIG. 5 if the top-left element is non-zero, but following the sequence in FIG. 6 if the top-left element is zero.

When subblock 'c' is scanned before subblock 'e,' after the scanning of subblock 'c,' if either of the elements in the left column in subblock 'c' is non-zero, subblock 'd' is scanned next in the sequence of FIG. 5. If both of the elements in the left column in subblock 'c' are zero but the right column in subblock 'c' contains a non-zero element, subblock 'd' is scanned next in the sequence of FIG. 7. If all of the elements in subblock 'c' are zero, subblock 'e' is scanned next.

When subblock 'd' is scanned before subblock 'e,' after the scanning of subblock 'd,' subblock 'e' is scanned, and then subblock 'f' is scanned. The scanning sequence within subblocks 'e' and 'f' is determined in a way analogous to the way in which the scanning sequences within subblocks 'c' and 'd' are determined.

Other cases are handled by analogy with the above. When all elements in subblocks 'c' and 'e' are zero, after subblocks 'c' and 'e' have been scanned, subblock 'd' is scanned in the sequence of FIG. 5, and then subblock 'f' is also scanned in the sequence of FIG. 5. In all, there are five possible scanning sequences of subblocks 'b' to 'f,' namely, 'b-c-d-e-f,' 'b-c-e-f-d,' 'b-c-e-d-f,' 'b-e-f-c-d,' and 'b-e-c-d-f.'

The scanning sequence within vertical group 16 is determined as follows.

First, the adaptive scanner 8 checks the top-left element in subblock 'g.' If this element is non-zero, subblock 'g' is scanned in the sequence shown in FIG. 4. If this element is zero, subblock 'g' is scanned in the sequence shown in FIG. 8.

If either of the elements in the top row in subblock 'g' is non-zero, then subblock 'h' is scanned next. Otherwise, subblock 'j' is scanned next. Blocks 'h' and 'j' are scanned in the same way as subblock 'g,' following the sequence in FIG. 4 if the top-left element is non-zero, and the sequence in FIG. 8 if the top-left element is zero.

When subblock 'h' is scanned before subblock 'j,' after the scanning of subblock 'h,' if either of the elements in the top row in subblock 'h' is non-zero, subblock 'i' is scanned next in the sequence of FIG. 4. If both of the elements in the top row in subblock 'h' are zero but the bottom row in subblock 'h' contains a non-zero element, subblock 'i' is scanned next in the sequence of FIG. 9. If all of the elements in subblock 'h' are zero, subblock 'j' is scanned next.

When subblock 'i' is scanned before subblock 'j,' after the scanning of subblock 'i,' subblock 'j' is scanned, and then subblock 'k' is scanned. The scanning sequence within subblocks 'j' and 'k' is determined in a way analogous to the way in which the scanning sequence within subblocks 'h' and 'i' is determined.

Other cases are handled by analogy with the above, subblocks 'i' and 'k' are scanned in the sequence of FIG. 4 when all elements of subblocks 'h' and 'j' are zero. In all, there are five possible scanning sequences of subblocks 'g' to 'k,' namely, 'g-h-i-j-k,' 'g-h-j-k-i,' 'g-h-j-i-k,' 'g-j-k-h-i,' and 'g-j-h-i-k.'

Each two-by-two subblock in the diagonal group 18 is scanned in the sequence of FIG. 4. Subblock 'l' is scanned first. If the left column in subblock 'l' contains a non-zero element, the other subblocks are scanned in the order 'm-o-n-p.' If the left column of subblock 'l' does not contain a non-zero element, the scanning order of the other subblocks is 'n-p-m-o.'

Due to this adaptive scanning, in the rearranged signal $T_A$, each of the three high-frequency groups 14, 16, and 18 tends to end in a terminal string of zeros, which the encoder 10 encodes as a single end-of-group or end-of-block codeword. The end-of-block codeword indicates that all non-zero elements in the wavelet block have been coded.

Aside from the end-of-group and end-of-block codewords, the encoder 10 produces one codeword for each non-zero value in the wavelet block. Due to the adaptive scanning, the non-zero values in each group tend to occur in clusters in the scanned linear sequence. In many cases, non-zero values occur consecutively, or are separated by just one zero value. The encoder 10 can code most of these consecutive or nearly-consecutive non-zero values with comparatively short codewords, thereby reducing the data size of the coded output $T_E$.

The general plan of the adaptive scanning scheme is that when the adaptive scanner 8 finds a non-zero value, it uses that information to find other non-zero values as quickly as possible. This is why the non-zero values tend to be clustered together in the rearranged output $T_A$ of the wavelet block.

Figure 10:
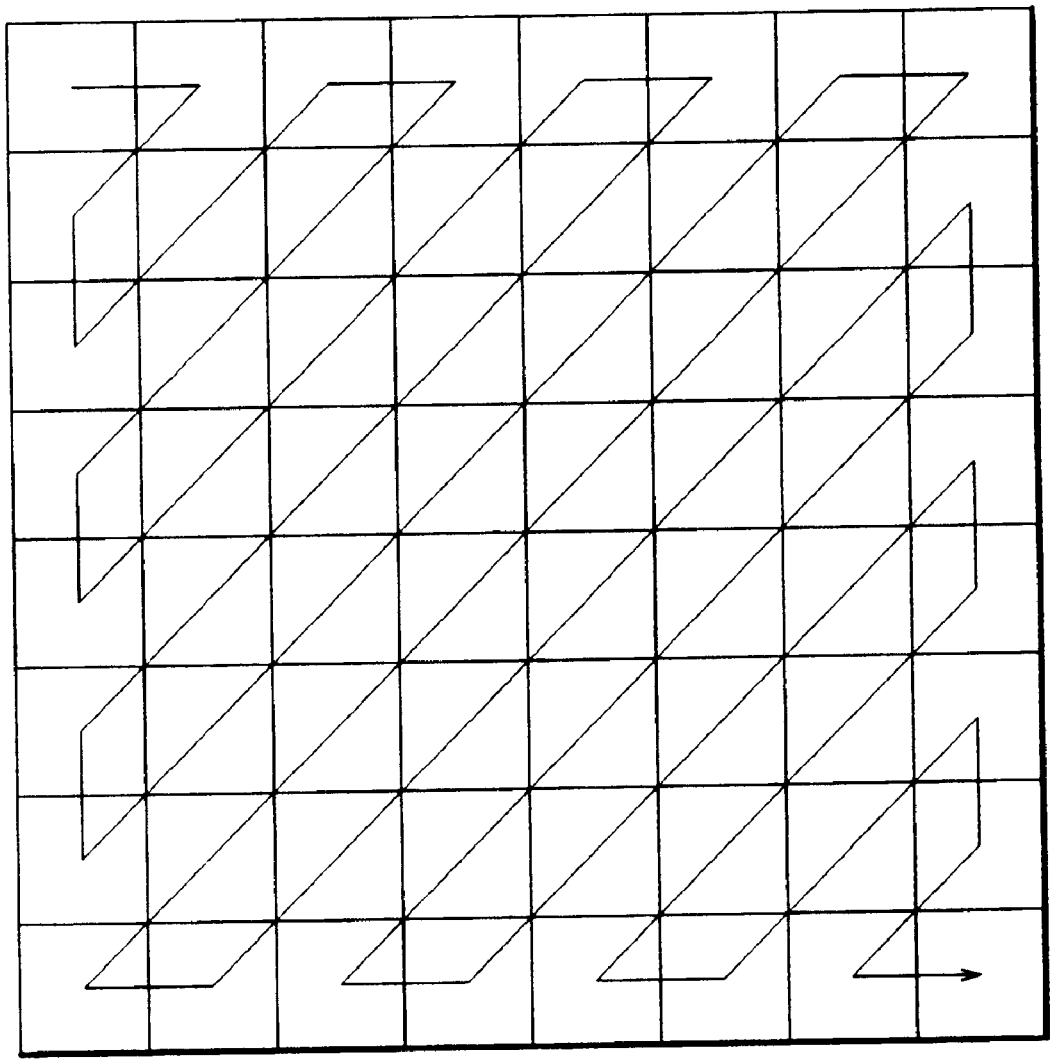
FIG. 10 illustrates a conventional zigzag scanning sequence.

For comparison, FIG. 10 shows the zigzag scanning sequence used after the discrete cosine transform in the prior art. If applied to the wavelet transform, this zigzag sequence would cycle back and forth among the three high-frequency groups 14, 16, and 18 in a fixed pattern. When most of the non-zero values are concentrated in just one or two of the three groups, a situation which is not uncommon in the wavelet transform, the zigzag sequence is obviously disadvantageous.

Second Embodiment

Figure 11:
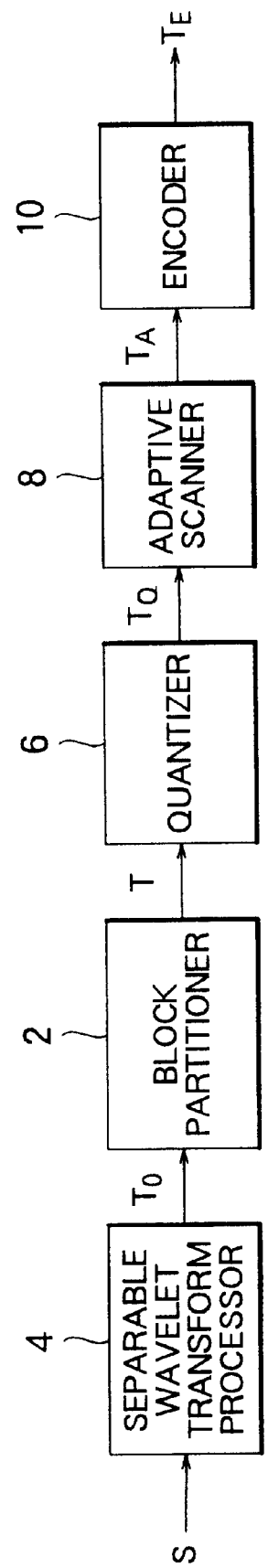
FIG. 11 is a block diagram of a second embodiment of the invention.

FIG. 11 illustrates a second embodiment of the invention, which interchanges the order of the block partitioner 2 and separable wavelet transform processor 4 of the first embodiment. The separable wavelet transform processor 4 first performs a separable wavelet transform with three frequency levels on the input signal S, thereby obtaining a transformed sign $T_0$. This signal $T_0$ has the same element values as the signal T in the first embodiment, but the elements are arranged in a different order. The block partitioner 2 rearranges the elements in $T_0$ to construct eight-by-eight wavelet blocks identical to those in the first embodiment. These wavelet blocks are quantized by the quantizer 6, adaptively scanned by the adaptive scanner 8, and encoded by the encoder 10 as in the first embodiment. The signals T, $T_Q$, $T_A$, and $T_E$ in FIG. 11 are identical to the corresponding signals in FIG. 1.

The second embodiment provides the same effects and advantages as the first embodiment.

Third Embodiment

Next, a third embodiment will be described. The third embodiment has the same hardware configuration as the first embodiment, which may be modified as in the second embodiment. The difference between the third embodiment and preceding embodiments lies in the operation of the adaptive scanner 8, which will be described with reference to FIGS. 12 and 13.

Figure 12:
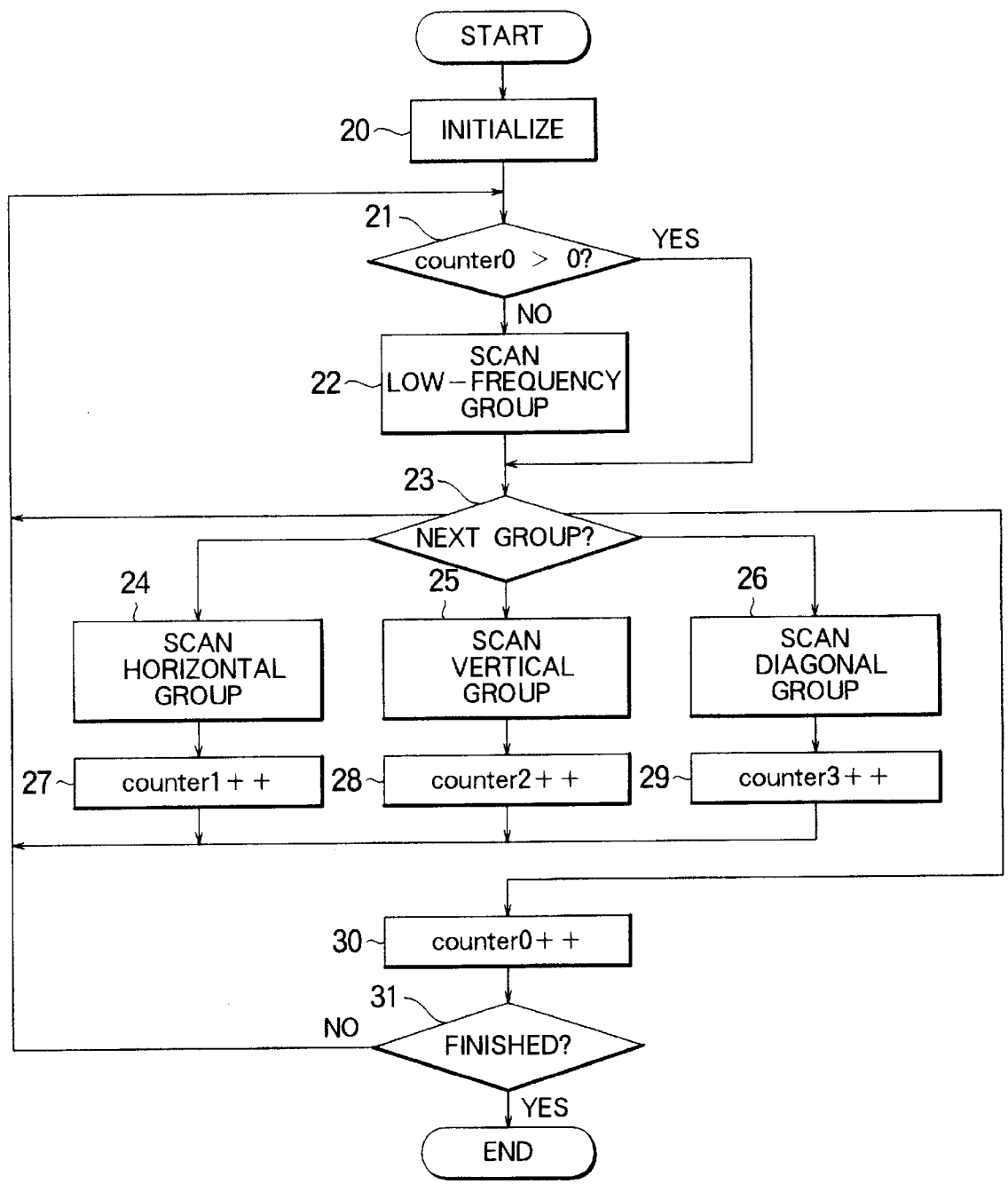
FIG. 12 is a flowchart illustrating a third embodiment.

Referring to the flowchart of FIG. 12, the adaptive scanner 8 in the third embodiment has four counters: counter0, which is used for an overall control; counter1, which controls scanning of the horizontal group; counter2, which controls scanning of the vertical group; and counter3, which controls scanning of the diagonal group. Before each wavelet block is scanned, all four counters are initialized to zero in step 20.

Counter0 is checked in the next step 21. If the value of counter0 is zero, the scan proceeds into the low-frequency group 12 (step 22). If the value of counter0 is greater than zero, scanning of the low-frequency group 12 in step 22 is skipped.

Figure 13:
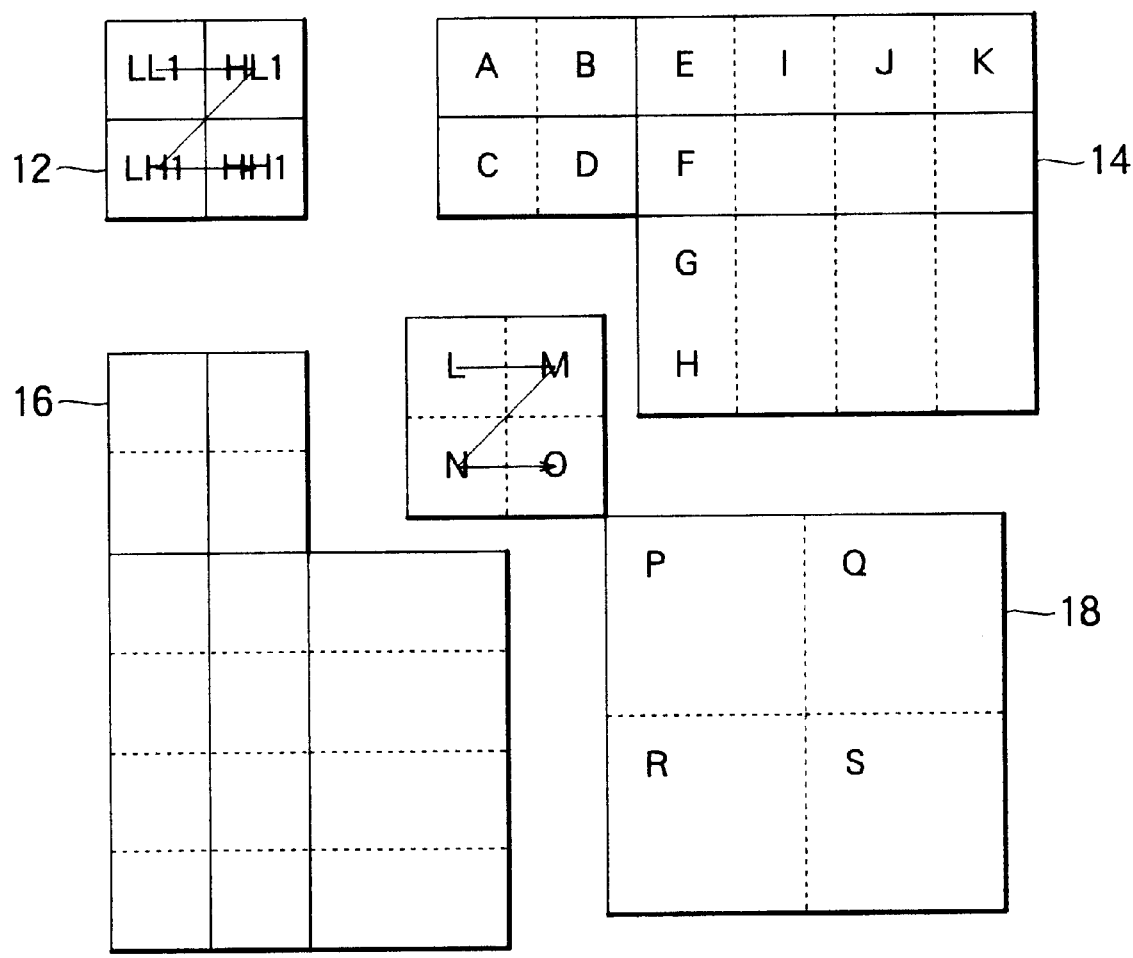
FIG. 13 identifies various elements in a wavelet block, for the purpose of describing the scanning sequence in the third embodiment.

In step 22, the elements in the low-frequency group 12 are scanned one at a time, in the order indicated in FIG. 13. After each element is scanned, a decision is made in step 23 as to which group to scan next. The way in which the decision in step 23 is made depends on the value of counter0.

When the value of counter0 is zero, if the element just scanned in the low-frequency group 12 was the purely low-frequency element LL1, the scan is sent back through steps 21 and 22 to scan the next element HL1 in the low-frequency group 12. A similar return to steps 21 and 22 is made after the horizontal element HL1 is scanned if the value of HL1 is zero, and after the vertical element LH1 is scanned if the value of LH1 is zero. If the horizontal, vertical, or diagonal element HL1, LH1, or HH1 in the low-frequency group 12 is non-zero, immediately after this non-zero element is scanned, the scan jumps to the corresponding high-frequency group. Specifically, the scan jumps to step 24, which at least partially scans the horizontal group, step 25, which at least partially scans the vertical group, or step 26, which at least partially scans the diagonal group. These three steps 24, 25, and 26 are followed by respective counter-incrementing steps 27, 28, and 29, which increment counter1, counter2, and counter3, after which the scanning process returns to step 21 to scan the next element in the low-frequency group 12. After the diagonal element HH1 has been scanned, and after a pass has been made through steps 26 and 29 if HH1 is zero, the scanning process jumps to step 30 to increment counter0, then to step 31 to decide whether the scan of the entire wavelet block is finished, and returns to step 21 if the entire scan is not finished.

When the value of counter0 is equal to one, the decision step 23 sends the scan into the high-frequency groups related to zero elements in the low-frequency group 12. Thus the scanning process proceeds through steps 24 and 27 if HL1 is zero, then through steps 25 and 28 if LH1 is zero, and then through steps 26 and 29 if HH1 is zero. After this, counter0 is incremented again in step 30, and the scanning process returns through step 31 to step 21.

When the value of counter0 is greater than one, the decision step unconditionally sends the scan through steps 24 and 27, then steps 25 and 28, then steps 26 and 29, to scan some or all of the remaining elements in the horizontal group 14, then the vertical group 16, and then the diagonal group 18. Counter0 is incremented in step 30 after each scan of the diagonal group, and if the scanning process is not finished, a return is made through step 31 to step 21.

When the scan enters the horizontal group in step 24, the first element to be scanned is the hitherto unscanned element in the lowest horizontal and vertical frequency component. When a non-zero element is scanned, the scan proceeds if possible to all of the related elements in the next higher vertical frequency component and next higher horizontal frequency component of the horizontal group. Elements are related if they pertain to the same part of the image block. When an element with a value of zero is scanned, the scan proceeds if possible to another unscanned element in the same horizontal and vertical frequency component, or preferably a lower frequency component, or exits the horizontal group scanning step 24 if no such element is to be found. No element is ever scanned twice. Each time the scan exits step 24, counter1 is incremented in step 27.

Referring again to FIG. 13, when the value of counter1 is zero, first element A is scanned. If A is zero, next the other element B in the same horizontal and vertical frequency component is scanned.

If element A is non-zero, then the related element C in the component with the next higher vertical frequency is scanned, followed by related elements E and I in the component with the next higher horizontal frequency. Elements C, E, and I are related to element A because they all pertain to the left half of the image block. If element E is zero, the scan proceeds immediately from element E to element I.

If element E is non-zero, before proceeding to element I, the scan proceeds to the related higher-frequency element F. If element F is zero, the scan returns to element I. If element F is non-zero, the related higher-frequency elements G and H are scanned, followed by element I. Elements E, F, G, and H are related because they all pertain to the first two columns of the image block.

If element I is non-zero, the scan proceeds to the related element below element I, and if that element is non-zero, to the two related elements further below. After this, the scan proceeds to lower-frequency element B. If element I is zero, the scan proceeds immediately from element I to element B.

When element B is scanned, if element B is non-zero, the scan proceeds to elements D, J, and K and continues in a manner analogous to the above-mentioned manner before exiting step 24. If element B is zero, the scan exits step 24 immediately.

Thus when the value of counter1 is zero, elements A and B are scanned, and if either of these elements is non-zero, further elements are also scanned. This part of the scan constitutes round one of the scanning of the horizontal group 14.

When the value of counter1 is one, elements A and B are skipped, because they have already been scanned, and any remaining unscanned elements in the two next-higher frequency components (comprising elements C, D, E, I, J, and K) are scanned. If any of these elements are non-zero, or if all of these elements have already been scanned, higher-frequency elements are also scanned in the manner described above. This part of the scan constitutes round two of the scanning of the horizontal group 14.

When the value of counter1 is two, any remaining unscanned elements are scanned. This part of the scan constitutes round three of the scanning of the horizontal group 14.

The scanning sequence of the vertical group in step 25 is similar to the sequence in the horizontal group scanning step 24, with the horizontal and vertical directions interchanged, and is also carried out in three rounds.

In the scanning of the diagonal group in step 26, when the value of counter3 is zero, elements L, M, N, and O are scanned in the zigzag sequence indicated in FIG. 13. If a non-zero value is encountered among these four elements, the related higher-frequency subblock P, Q, R, or S is immediately scanned in the same zigzag sequence. For example, if element L is non-zero, the scan proceeds from element L to subblock P, then returns to element M. After the scanning of element O, and of subblock S if element O is non-zero, the scan exits step 26, and counter3 is incremented from zero to one.

When the value of counter3 is equal to one, the remaining unscanned subblocks among subblocks P, Q, R, and S are scanned, in this order, each in the same zigzag sequence as the L-M-N-O subblock. The scanning of the diagonal group 18 is completed in two rounds.

The decision in step 31 as to whether the scan is finished is made by examining counter1, counter2, and counter3. In the present embodiment, in which the wavelet transform has three levels, the scan is finished when counter1 and counter2 both have values of at least three, and counter3 has a value of at least two.

The third embodiment follows the same basic scanning strategy as the first embodiment, using non-zero values to find further non-zero values quickly, but does so in a way that allows the scan to exit a group quickly when the adaptive scanner 8 stops finding non-zero values in that group. This feature is advantageous when, for example, the non-zero values are clustered in the low-frequency group 12 and in the comparatively low-frequency elements of all three high-frequency groups 14, 16, and 18. Most of the zero values in the wavelet block can then be placed in a single long terminal sequence and encoded by a single end-of-block code, leading to further gains in coding efficiency.

Fourth Embodiment

The fourth embodiment adds one extra step to the operation of the adaptive scanner 8 in the third embodiment. Otherwise, the fourth embodiment is identical to the third embodiment.

Figure 14:
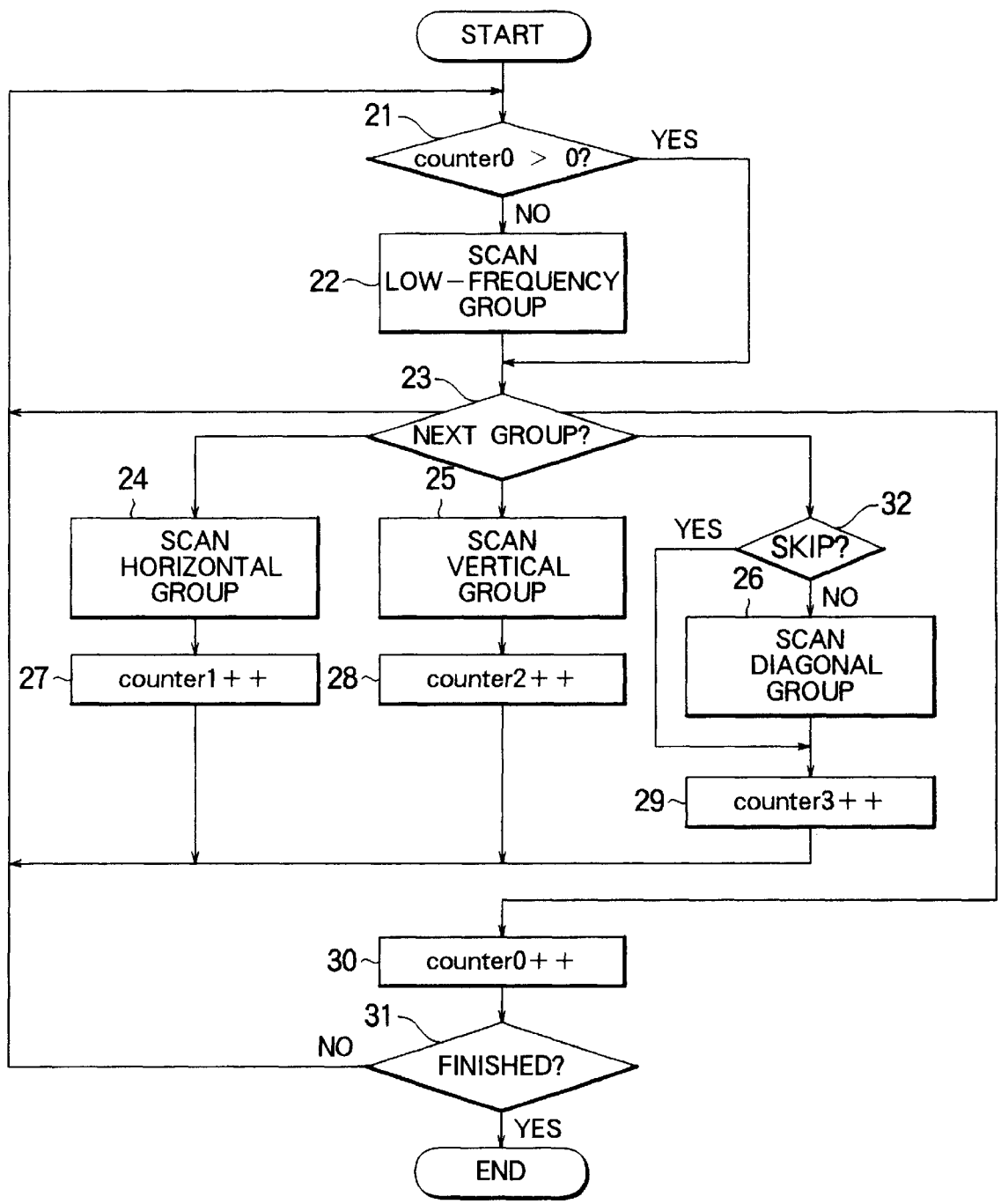
FIG. 14 is a flowchart illustrating a fourth embodiment of the invention.

Referring to FIG. 14, the extra step is a decision step 32 that skips the following diagonal-group scanning step 26 when the value of counter3 is one or two. This step delays the scanning of blocks P, Q, R, and S in FIG. 13 when the corresponding elements L, M, N and O have values of zero.

In step 31, the scanning of the diagonal group is determined to be finished when counter3 has a value of four instead of a value of two.

Aside from these differences, the fourth embodiment operates like the third embodiment. The other steps in FIG. 14 are the same as the steps in FIG. 12 with the same reference numerals.

When one of elements L, M, N, and O in the diagonal group has a value of zero, there is a strong possibility that the corresponding block P, Q, R, or S will consist entirely of zeros, so delaying the scanning of these blocks tends to increase the length of the terminal string of zeros in the wavelet block, thereby improving the coding efficiency.

Fifth Embodiment

The fifth embodiment employs the inseparable wavelet transform instead of the separable wavelet transform.

Figure 15:
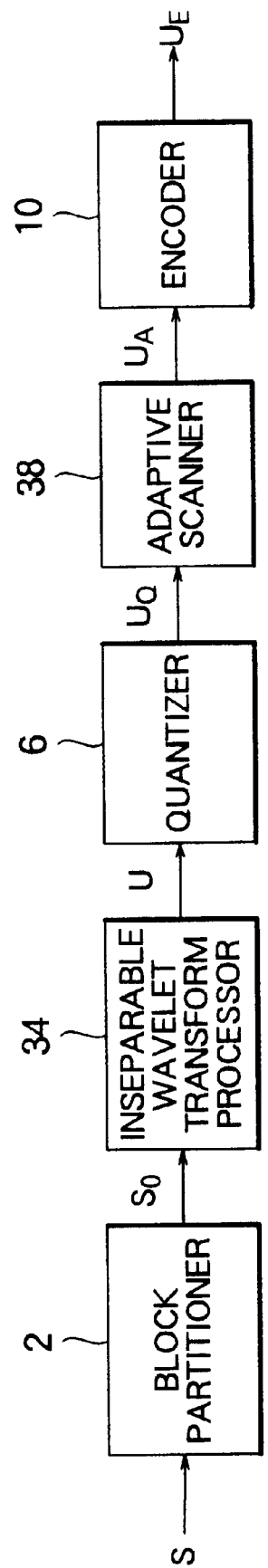
FIG. 15 is a block diagram illustrating a fifth embodiment.

Referring to FIG. 15, the fifth embodiment comprises a block partitioner 2, an inseparable wavelet transform processor 34, a quantizer 6, an adaptive scanner 38, and an encoder 10. The block partitioner 2, quantizer 6, and encoder 10 are as described in the first embodiment. The inseparable wavelet transform processor 34 produces a transformed signal U which is quantized by the quantizer 6, the quantized signal $U_Q$ is rearranged by the adaptive scanner 38, and the rearranged signal $U_A$ is encoded by the encoder 10 to produce an encoded signal $U_E$.

Figure 16:
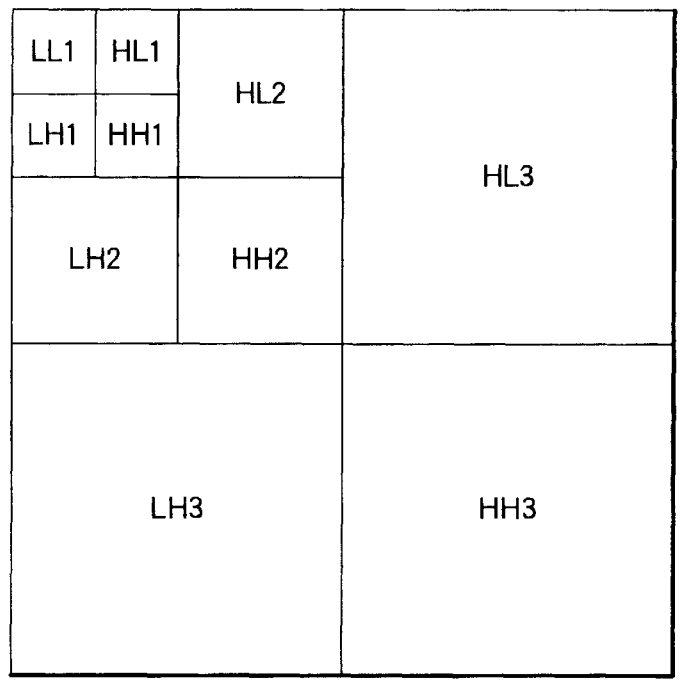
FIG. 16 illustrates the division of a wavelet block into frequency components in the fifth embodiment.

In each image block, the inseparable wavelet transform processor 34 begins by separating low-frequency components from high-frequency components both horizontally and vertically. Referring to FIG. 16, this produces one purely low-frequency component and three components, denoted LH3, HL3, and HH3, having high frequencies in one or both of the horizontal and vertical dimensions. The low-frequency component is then subdivided in the same way, producing a further low-frequency component and three high-frequency components LH2, HL2, and HH2. The further low-frequency component is then similarly subdivided to produce elements LL1, LH1, HL1, and HH1, which are the same as in FIG. 2.

Figure 17:
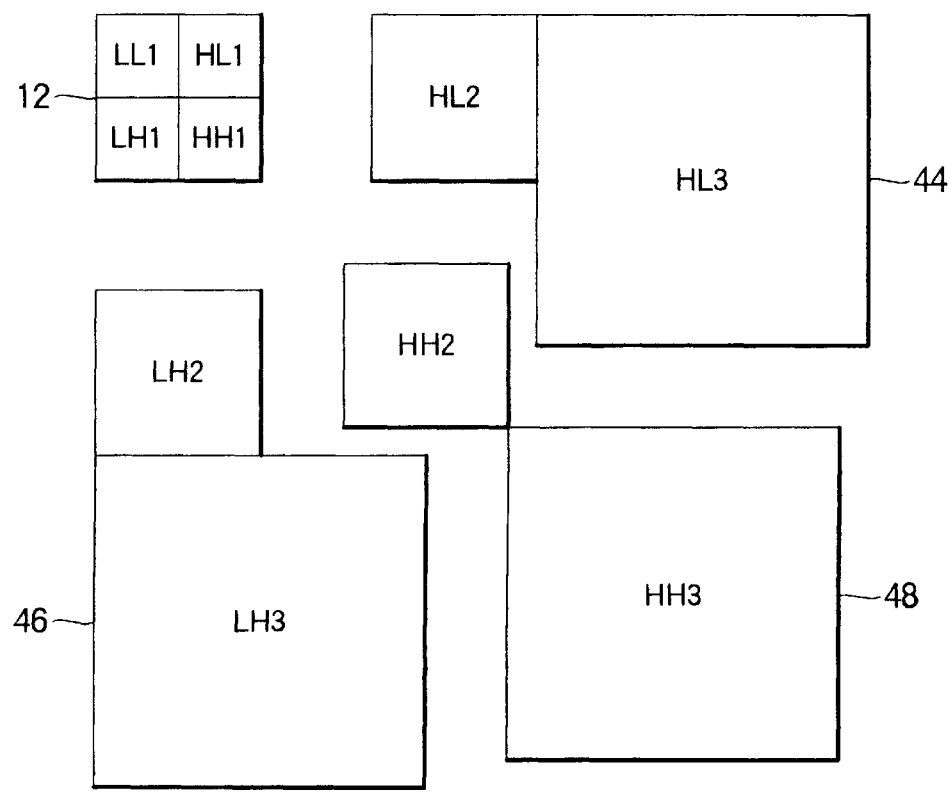
FIG. 17 illustrates the division of a wavelet block into spatial frequency groups in the fifth embodiment.

The wavelet block in FIG. 16 can be divided into groups as shown in FIG. 17. The low-frequency group 12 is the same as in the preceding embodiments. The horizontal group 44 comprises a two-by-two subblock HL2 and a four-by-four subblock HL3. The vertical group 46 comprises a two-by-two subblock LH2 and a four-by-four subblock LH3. The diagonal group 48 comprises a two-by-two subblock HH2 and a four-by-four subblock HH3.

The adaptive scanner 38 begins by scanning the low-frequency group 12 in the same way as in the first embodiment, following the sequence shown in FIG. 4. The order in which the three high-frequency groups 44, 46, and 48 are scanned is then determined as in the first embodiment: first, if HL1 is non-zero, the horizontal group 44 is scanned; next, if LH1 is non-zero, the vertical group is scanned; next, if HH1 is non-zero, the diagonal group 48 is scanned; then, if HL1 is zero, the horizontal group 44 is scanned; then, if HL1 is zero, the vertical group is scanned; and finally, if HH1 is zero, the diagonal group 48 is scanned.

The scanning sequence in the horizontal group 44 is determined as follows.

First, the adaptive scanner 38 checks the upper-left element in the HL2 subblock, scans the HL2 subblock in the sequence shown in FIG. 4 if this element is zero, and scans the HL2 subblock in the sequence shown in FIG. 6 if this element is zero.

Figure 19:
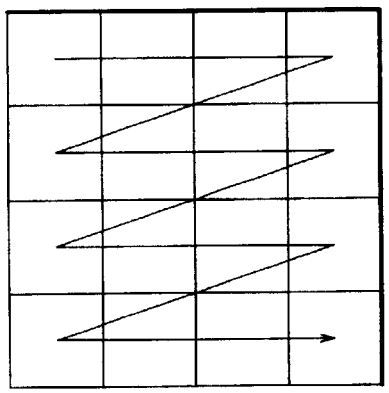
Figure 18:
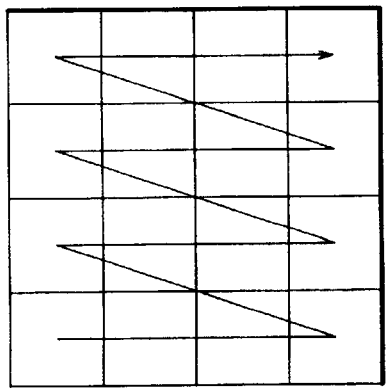

Next, if either of the elements in the left-hand column in the HL2 subblock is non-zero, the adaptive scanner 38 scans the HL3 subblock in the sequence shown in FIG. 18. If both of the elements in the left-hand column in the HL2 subblock are non-zero, the adaptive scanner 38 scans the HL3 subblock in the sequence shown in FIG. 19.

The scanning sequence in the vertical group 46 is determined as follows.

First, the adaptive scanner 38 checks the upper-left element in the LH2 subblock, scans the LH2 subblock in the sequence shown in FIG. 4 if this element is zero, and scans the LH2 subblock in the sequence shown in FIG. 8 if this element is zero.

Figure 20:
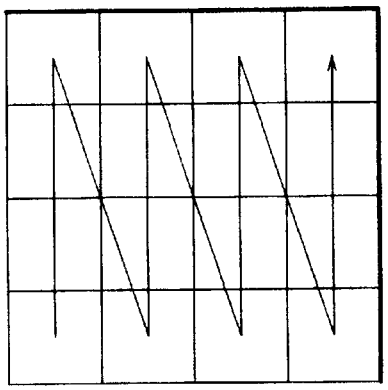
FIGS. 18, 19, 20, 21, and 22 illustrate scanning sequences employed in four-by-four subblocks in the fifth embodiment.
Figure 21:
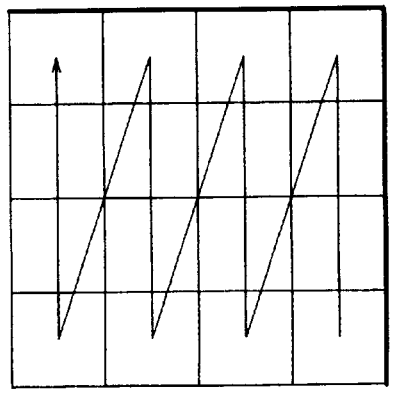

Next, if either of the elements in the top row in the LH2 subblock is non-zero, the adaptive scanner 38 scans the LH3 subblock in the sequence shown in FIG. 20. If both of the elements in the top row in the LH2 subblock are non-zero, the adaptive scanner 38 scans the LH3 subblock in the sequence shown in FIG. 21.

Figure 22:
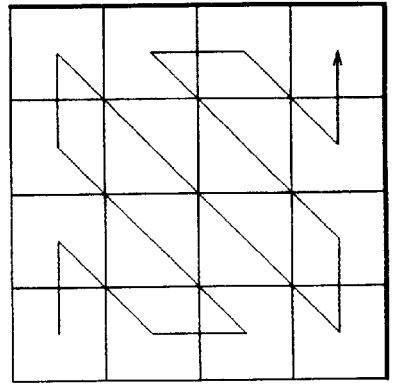

In the diagonal group 48, the adaptive scanner 38 scans the HH2 subblock in the sequence shown in FIG. 4, then scans the HH3 subblock in the sequence shown in FIG. 22.

The fifth embodiment has the same general effect for the inseparable wavelet transform as the first embodiment has for the separable wavelet transform. By determining the scanning order according to the occurrence of non-zero elements, the adaptive scanner 38 is able to produce clusters of non-zero elements in the rearranged signal $U_A$, thereby improving the coding efficiency.

Sixth Embodiment

The sixth embodiment compresses an image having an arbitrary shape.

Figure 23:
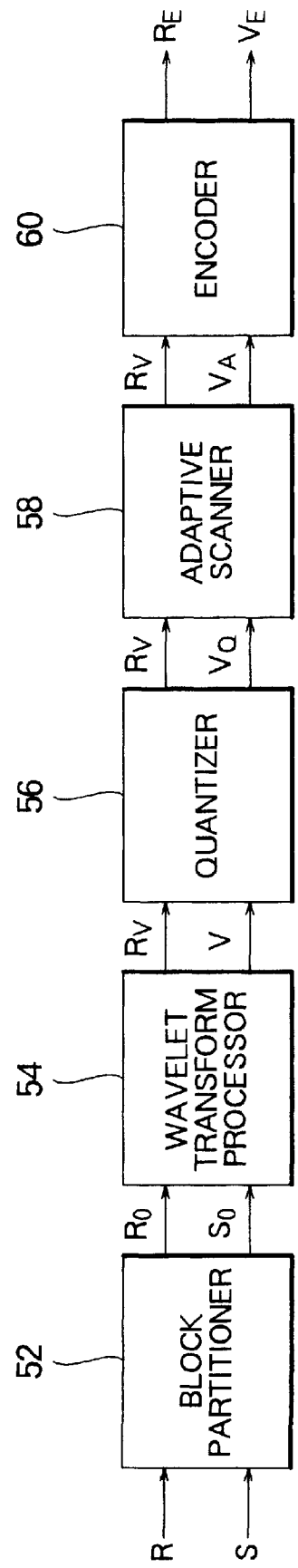
FIG. 23 is a block diagram illustrating a sixth embodiment of the invention.

Referring to FIG. 23, the image signal S in the sixth embodiment is accompanied by shape information R describing the shape of the image. The image is treated as being embedded in a rectangular area. The shape information R indicates the dimensions of the rectangular area, and indicates which parts of the rectangular area belong to the image. The image signal S comprises only the picture elements of the image area.

The block partitioner 52 divides the rectangular area into eight-by-eight blocks and alters the image signal and shape information so as to describe the picture elements and image areas in each eight-by-eight block. These altered signals $R_0$ and $S_0$ are provided to a wavelet transform processor 54, which carries out a separable wavelet transform on the image area in each block, producing a wavelet transform signal V. When only part of an image block belongs to the image, the wavelet transform is restricted to that part, and the resulting wavelet block may have fewer than sixty-four elements. The wavelet transform processor 54 also transforms the shape information $R_0$ into information $R_V$ indicating which parts of each wavelet block contain transformed element values and which parts are empty. The quantizer 56 quantizes the wavelet transform signal V.

The adaptive scanner 58 scans each wavelet block as described in the third embodiment, using the shape information $R_V$ to skip over non-existent elements. The scanning sequence is determined as described in the third embodiment, wherein non-existent elements are treated as having zero values.

The encoder 60 encodes the rearranged wavelet transform $V_A$ to obtain an encoded wavelet signal $V_E$, and encodes the shape information $R_V$ to obtain encoded shape information $R_E$.

The sixth embodiment provides the same effects as the third embodiment, but provides them for images of arbitrary shape.

The sixth embodiment can be modified in various ways. The adaptive scanner 58 can use the scanning procedure of the first or fourth embodiment instead of the scanning procedure of the third embodiment. Alternatively, the wavelet transform processor 54 can perform an inseparable wavelet transform, and the adaptive scanner 58 can use the scanning procedure of the fifth embodiment. The wavelet transform can be performed before the block subdivision of the image signal, as in the second embodiment.

The other embodiments can also be modified in various ways. For example, the wavelet transform was described as an iterated filtering operation in each dimension, but in the first four embodiments, which employ the separable wavelet transform, all of the horizontal iterations can be replaced by a single matrix operation, and all of the vertical iterations can likewise be replaced by a single matrix operation.

The number of iterations is not limited to three, and the image block size is not limited to eight-by-eight. The embodiments above can readily be extended to more (or fewer) iterations, larger (or smaller) image blocks, and larger (or smaller) wavelet blocks.

In the embodiments above, the wavelet transform was iterated until there was only one purely low-frequency element LL1 left in each wavelet block, but this condition is not necessary. Two or more purely-low-frequency elements can be left in each wavelet block, in which case all of these purely-low-frequency elements are preferably scanned before any higher-frequency elements are scanned.

The wavelet blocks do not have to be square blocks. The invention can be practiced with M×N blocks, where M and N are any two integers that are both greater than unity.

The first and fifth embodiments can be varied by jumping immediately from the scanning of a non-zero element in the low-frequency group 12 to scan the related high-frequency group, as in the third embodiment. The first and fifth embodiments can also be varied by scanning each of the high-frequency groups in multiple rounds, as in the third embodiment, instead of scanning all elements of each high-frequency group in a single pass.

Conversely, the third and fourth embodiments can be varied by scanning the entire low-frequency group 12 before scanning any of the elements in the high-frequency groups.

The second embodiment can be varied by interchanging the order of the block partitioner 2 and quantizer 6, so that block partitioning is performed after quantization.

The horizontal-vertical-diagonal default order followed in the embodiments above can be changed to a vertical-horizontal-diagonal order.

Those skilled in the art will recognize that further variations are possible within the scope of the invention as claimed below.

What is claimed is:

1. A method of encoding a digitized image, said method comprising:

dividing the digitized image into image blocks;

performing a wavelet transform on each image block among the image blocks, thereby obtaining, for each image block, a wavelet block having at least one purely low-frequency element, a plurality of diagonal high-frequency elements representing equal horizontal and vertical spatial frequencies, a plurality of horizontal high-frequency elements representing higher horizontal than vertical spatial frequencies, and a plurality of vertical high-frequency elements representing higher vertical than horizontal spatial frequencies;

quantizing the elements in each of the wavelet blocks;

scanning each of the wavelet blocks, starting with the low-frequency element and proceeding through the horizontal, vertical, and diagonal high-frequency elements in a sequence responsive to occurrences of non-zero elements among the horizontal, vertical, and diagonal high-frequency elements, thereby rearranging the elements in each of the wavelet blocks in a linear sequence;

coding the elements in each of the wavelet blocks according to the linear sequence;

wherein all purely low-frequency elements and the horizontal, vertical, and diagonal high-frequency elements having lowest spatial frequencies constitute a low-frequency group, and among the high-frequency elements having higher spatial frequencies, the horizontal elements constitute a horizontal group, the vertical elements constitute a vertical group, and the diagonal elements constitute a diagonal group, said scanning further comprises:

scanning at least part of the horizontal group if the low-frequency group has a non-zero horizontal element, and scanning at least part of the vertical group if the low-frequency group has a non-zero vertical element;

scanning at least part of the diagonal group if the low-frequency group has a non-zero diagonal element that is not a purely low-frequency element;

scanning at least part of the horizontal group if the low-frequency group has a zero-valued horizontal element, and scanning at least part of the vertical group if the low-frequency group has a zero-valued vertical element; and scanning at least part of the diagonal group if the low-frequency group has a zero-valued diagonal element that is not a purely low-frequency element.

2. A method as claimed in claim 1 wherein:

when a non-zero horizontal element is scanned in the low-frequency group, said scanning at least part of the horizontal group is performed before further elements in the low-frequency group are scanned; and when a non-zero vertical element is scanned in the low-frequency group, said scanning at least part of the vertical group is performed before further elements in the low-frequency group are scanned.

3. A method as claimed in claim 1, wherein the horizontal group, the vertical group, and the diagonal group are divided into two-by-two subblocks, and in said scanning, when any one of the two-by-two subblocks is scanned, all elements in that two-by-two subblock are scanned before any elements in any other two-by-two subblocks are scanned.

4. A method as claimed in claim 1, wherein:

within each group among the horizontal group, the vertical group, and the diagonal group, when a non-zero element is scanned, a related element with a higher spatial frequency is scanned next if possible, and when a zero-valued element is scanned, a related element with a lower spatial frequency is scanned next if possible.

5. A method as claimed in claim 1, wherein elements that have a highest spatial frequency in the diagonal group and are related to zero-valued lower-frequency elements in the diagonal group are scanned last among all elements in the wavelet block.

6. A method as claimed in claim 1 wherein, among elements with identical spatial frequencies, elements related to lower-frequency non-zero elements are scanned before elements related to zero-valued lower-frequency elements.

7. An image compressor for compressing a digitized image, said image compressor comprising:

a block partitioner for partitioning the digitized image into image blocks;

a wavelet transform processor, coupled to said block partitioner, for performing a wavelet transform on each image block, thereby obtaining, for each image block, a wavelet block having at least one purely low-frequency element, a plurality of diagonal high-frequency elements representing equal horizontal and vertical spatial frequencies, a plurality of horizontal high-frequency elements representing higher horizontal than vertical spatial frequencies, and a plurality of vertical high-frequency elements representing higher vertical than horizontal spatial frequencies;

a quantizer, coupled to said wavelet transform processor, for quantizing the elements in each of the wavelet blocks;

an adaptive scanner, coupled to said quantizer, for scanning each of the wavelet blocks as quantized by said quantizer, starting with the purely low-frequency element and scanning the horizontal, vertical, and diagonal high-frequency elements in a sequence responsive to occurrences of non-zero elements among the horizontal, vertical, and diagonal high-frequency elements, thereby rearranging the elements in each of the wavelet blocks in a linear sequence;

an encoder, coupled to said adaptive scanner, for coding the elements in each of the wavelet blocks, as quantized by said quantizer, according to the linear sequence;

wherein all purely low-frequency elements and the horizontal, vertical, and diagonal high-frequency elements having lowest spatial frequencies constitute a low-frequency group, and among the high-frequency elements having higher spatial frequencies, the horizontal elements constitute a horizontal group, the vertical elements constitute a vertical group, and the diagonal elements constitute a diagonal group, and wherein in scanning each of the wavelet blocks, said adaptive scanner:

scans at least part of the horizontal group if the low-frequency group has a non-zero horizontal element, and scans at least part of the vertical group if the low-frequency group has a non-zero vertical element;

scans at least part of the diagonal group if the low-frequency group has a non-zero diagonal element that is not a purely low-frequency element;

scans at least part of the horizontal group if the low-frequency group has a zero-valued horizontal element, and scans at least part of the vertical group if the low-frequency group has a zero-valued vertical element; and scans at least part of the diagonal group if the low-frequency group has a zero-valued diagonal element that is not a purely low-frequency element.

8. An apparatus as claimed in claim 7 wherein:

upon scanning a non-zero horizontal element in the low-frequency group, said adaptive scanner proceeds to scan at least part of the horizontal group before scanning further elements in said low-frequency group; and upon scanning a non-zero vertical element in the low-frequency group, said adaptive scanner proceeds to scan at least part of the vertical group before scanning further elements in the low-frequency group.

9. An apparatus as claimed in claim 7, wherein the horizontal group, the vertical group, and the diagonal group are divided into two-by-two subblocks, and said adaptive scanner scans each one of the two-by-two subblocks completely before proceeding to scan any other one of the two-by-two subblocks.

10. An apparatus as claimed in claim 7, wherein:

within each group among the horizontal group, the vertical group, and the diagonal group, upon scanning a non-zero element, said adaptive scanner proceeds, if possible, to scan a related element with a higher spatial frequency, and upon scanning a zero-valued element, said adaptive scanner proceeds, if possible, to scan a related element with a lower spatial frequency.

11. An apparatus as claimed in claim 7, wherein said adaptive scanner scans last, among all elements in the wavelet block, the diagonal elements that have a highest spatial frequency in the diagonal group and are related to zero-valued lower-frequency elements in the diagonal group.

12. An apparatus as claimed in claim 7 wherein, among elements with identical spatial frequencies, said adaptive scanner scans elements related to lower-frequency non-zero elements before scanning elements related to zero-valued lower-frequency elements.

* * * * *